United States Patent [19]

Gourley

[11] 4,435,320
[45] Mar. 6, 1984

[54] DISPERSE AZO DYES FROM 2-AMINO-3,5-BISFLUOROSULPHONYL THIOPHENE AND ANILINE, TETRAHYDROQUINOLINE, AND BENZOMORPHOLINE COUPLERS

[75] Inventor: Robert N. Gourley, Liverpool, England

[73] Assignee: Eastman Kodak Company, Rochester, N.Y.

[21] Appl. No.: 346,831

[22] Filed: Feb. 8, 1982

[30] Foreign Application Priority Data
Nov. 4, 1981 [GB] United Kingdom ............... 8133251

[51] Int. Cl.³ ............... C09B 29/033; C09B 29/09; C09B 29/36; C09B 29/44
[52] U.S. Cl. .................................. 260/152; 260/155; 260/156
[58] Field of Search ..................... 260/152, 155, 156

[56] References Cited

U.S. PATENT DOCUMENTS

| | | | |
|---|---|---|---|
| 2,154,186 | 4/1939 | Schweitzer et al. | 260/163 |
| 2,427,995 | 9/1947 | Parker et al. | 260/188 |
| 2,576,037 | 11/1951 | Parker et al. | 260/205 |
| 2,825,726 | 3/1958 | Towne et al. | 260/152 |
| 4,283,332 | 8/1981 | Gourley | 260/155 |

Primary Examiner—Floyd D. Higel
Attorney, Agent, or Firm—Donald W. Spurrell; Daniel B. Reece, III

[57] ABSTRACT

Disclosed are new azo dyes from 2-amino-3,5-bisfluorosulphonyl thiophene which may be further substituted, and certain aniline, tetrahydroquinoline and benzomorpholine couplers. These dyes produce bright blue shades on hydrophobic fibres including polyesters, polyamides and cellulose esters, both by dyeing and heat transfer printing, and show improvements in one or more properties of dyeability, low energy of application, fastness to light, gas and wash, and heat stability, and have the general formula

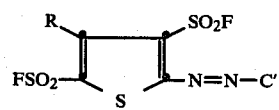

wherein R is hydrogen, alkyl or alkyl substituted with aryl or cycloalkyl; and C' represents an aniline, 1,2,3,4-tetrahydroquinoline, or benzomorpholine disperse dye coupling component.

11 Claims, No Drawings

DISPERSE AZO DYES FROM 2-AMINO-3,5-BISFLUOROSULPHONYL THIOPHENE AND ANILINE, TETRAHYDROQUINOLINE, AND BENZOMORPHOLINE COUPLERS

This invention relates to azo dyes of the general formula:

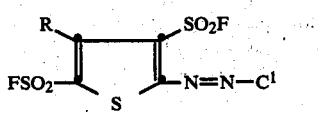

wherein R is selected from hydrogen, alkyl, and alkyl substituted with aryl or cycloalkyl; and $C^1$ is an aniline, 1,2,3,4-tetrahydroquinoline or benzomorpholine type disperse dye coupler which may be substituted as shown below.

The dyes produce bright blue shades, particularly on polyester fibres, and exhibit improvements in one or more of such properties as fastness to light, oxides of nitrogen, wash, and ozone, stability to heat, perspiration and pH change, resistance to crocking, and dyeability including low energy level, migration, levelling, and build.

More specifically, in the above formula $C^1$ is a coupler selected from those of the formulae

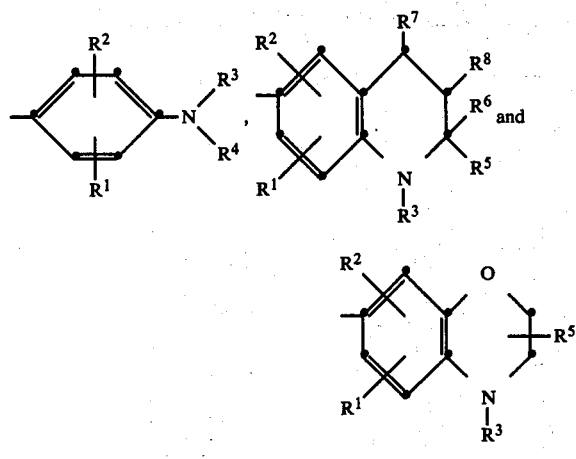

wherein $R^1$ and $R^2$ are each selected from hydrogen, fluorine, chlorine, bromine, alkyl, alkoxy, phenoxy, alkylthio, arylthio, and radicals having the formula —NH—X—$R^9$ in which X is —CO—, —COO—, or —SO$_2$— and $R^9$ is selected from alkyl and alkyl substituted with halogen, hydroxy, phenoxy, aryl, cyano, cycloalkyl, alkylsulphonyl, alkylthio, alkanoyloxy, and alkoxy, and when X is —CO—, $R^9$ is also selected from hydrogen, amino, alkenyl, alkylamino, dialkylamino, arylamino, aryl, or furyl;

$R^3$ and $R^4$ are selected from hydrogen; cycloalkyl; cycloalkyl substituted with one or two groups selected from alkyl, —OH, alkoxy, halogen and hydroxy substituted alkyl; phenyl or phenyl substituted with alkyl, alkoxy, halogen, alkanoylamino, cyano or alkoxycarbonyl; straight or branched alkenyl; straight or branched alkyl and such alkyl substituted with one to three of the following: hydroxy; halogen; cyano; alkoxy; alkoxy-alkoxy; acyloxy; phenoxy; phenylcarbamoyloxy; cyclohexyl; phenyl or phenyl substituted with alkyl, alkoxy, halogen, acylamido, cyano or alkoxycarbonyl; alkanoylamino; sulphamoyl; alkylsulphamoyl; alkylsulphonamido; phenylsulphonamido; alkoxycarbonylamino; alkylcarbamoyloxy; alkoxycarbonyl; alkoxycarbonyloxy; and alkenylcarbonylamino; and $R^3$ and $R^4$ can be a single group such as pentamethylene, ethyleneoxyethylene or ethylenesulphonylethylene which, with the nitrogen atom to which it is attached, forms a ring;

$R^5$, $R^6$, $R^7$ and $R^8$ are each selected from hydrogen and alkyl; and wherein all of the above alkyl, alkoxy, alkenyl, and alkanoyl moieties contain from 1–8 carbons.

Preferred of the above dyes are those wherein R is H; $R_1$ is H, alkyl, or —NH—X—$R^9$; $R_2$ is H or alkyl; $R_3$ is H or $R_4$; and $R_4$ is selected from cycloalkyl, alkenyl, straight or branched alkyl and such alkyl substituted with one to three of alkoxy, alkoxycarbonyl, acyloxy, alkanoylamino, phenyl, cyclohexyl, cyano, carbamoyl, sulphamyl, phenoxy or hydroxy.

The diazotizable amino may be prepared by reacting the 2-chlorothiophene with chlorosulphonic acid, carrying out chlorine displacement with potassium fluoride, followed by amination of the 2-chlorine with hexamine. An example of such a preparation will now be given.

(a) Preparation of 2-Chloro-3,5-bischlorosulphonyl-thiophene

2-Chlorothiophene (40 g) was added to stirred chlorosulphonic acid (400 ml) over a five minute period. The solution was then heated at 80°–90° C. for four hours, cooled to 30° C., and added to ice-water with stirring. The product was filtered off, washed with water and dried. The yield was 84 g.

(b) Preparation of 2-Chloro-3,5-bisfluorosulphonyl-thiophene

A solution of 2-chloro-3,5-bischlorosulphonylthiophene (10 g) was added with stirring at 25° C. to a solution of potassium fluoride (60 g) in water (200 ml). The mixture was stirred at 25° C., for 1 hour, poured into water (1 liter) and extracted with ethyl acetate to give the product as an oil. The yield was 9 g.

(c) Preparation of 2-Amino-3,5-bisfluorosulphonyl-thiophene

A mixture of 2-chloro-3,5-bisfluorosulphonylthiophene (8.5 g), hexamine (8.5 g) and methanol (90 ml) was stirred under reflux for one hour. The mixture was cooled to 25° C., poured into dilute sulphuric acid and extracted with ethyl acetate to give the product as an oil (6.3 g).

The invention will be further illustrated by the following examples although it will be understood that these examples are included merely for purposes of illustration and are not intended to limit the scope of the invention.

EXAMPLE 1

Sodium nitrite (0.72 g) was added with stirring to concentrated sulphuric acid (5 ml) and the resultant solution of nitrosyl sulphuric acid was heated at 70° C. for five minutes. A mixture of propionic acid and acetic acid (1:5 acid) (10 ml) was then added at below 20° C., followed by 2-amino-3,5-bisfluorosulphonylthiophene (2.63 g) at 0°–5° C. and then a further portion of 1:5 acid (10 ml). The mixture was stirred for two hours at 0°–5° C. and then added to a solution of N,N-diethyl-m- acetamido aniline (2.06 g) in dilute sulphuric acid and ice. After the mixture had been stirred for 15 minutes, the dye was filtered off and dried. This dye when applied to fibres, particularly polyester or its blends by known techniques, gave bright blue shades with good dyeing and fastness properties. It was also applied to polyester by heat transfer printing, and bright blue prints of good strength and fastness properties were obtained.

By using the procedure of Example 1, the following dyes were obtained.

| Ex. No. | Coupler | Shade on Polyester |
|---|---|---|
| 2 | N,N—Diethylaniline | Reddish-blue |
| 3 | N,N—Diethyl-m-toluidine | Reddish-blue |
| 4 | N—Ethyl-2,2,4,7-tetramethyl-tetrahydroquinoline | Blue |
| 5 | N—Ethyl-3,6-dimethyl 1,4-benzoxazine | Blue |
| 6 | N—Sec Butyl-2-methoxy-5-acetamidoaniline | Greenish-blue |
| 7 | N,N—Diethyl-2-methoxy-5-acetamidoaniline | Greenish-blue |
| 8 | N—Isopropyl-2,5-dimethyl-aniline | Reddish-blue |
| 9 | N—Ethyl-2-methoxy-5-methyl-aniline | Reddish-blue |

A typical general procedure by which polyester, e.g. poly(ethylene terephthalate), can be dyed with the present dyes is as follows. The dye cake is dispersed by heating and agitating a dyepot containing the dye cake and methyl cellosolve. When the dye cake has been ground free of lumps and substantially dissolved in the methyl cellosolve, 2.0% based on weight of the fabric of Igepon T-51 and 2.0% based on weight of the fabric of sodium lignin sulphonate from a premixed solution of the two components is added. Sufficient demineralized water is added to make about a 30:1 bath ratio of water to dye and a small amount of Versene 100 (sodium salt of ethylenediaminetetraacetic acid) and Tanalon JDM-72 (dye carrier) are added. The pH of the dyebath is adjusted to about 5.0 with acetic acid. The fabric samples (wet-out) are put into the dyepot and the entire contents thereof placed in a pressure dyeing container. The container is sealed and placed in a high temperature Launder-Ometer which is heated to 49° C. and rotation thereof started. The temperature of the Launder-Ometer is raised to 129° C. at the rate of about 2.8° C. per minute, and maintained at this temperature for 1 hour. The Launder-Ometer is then cooled, and the fabric samples removed and scoured in demineralized water containing 1 g/liter of neutral soap and 1 g/liter of sodium carbonate. The samples are rinsed in cold demineralized water and dried at 121° C. in a forced air oven.

The following tables give exemplary dyes of the present invention.

TABLE 1

[Structure: thiazole ring with R and $SO_2F$ substituents, $FSO_2$—C linked through S, C—N=N— to benzene ring with $R^2$, $R^1$, and $N(R^3)(R^4)$ group]

| R | $R^1$ | $R^2$ | $R^3$ | $R^4$ |
|---|---|---|---|---|
| $CH_3$ | H | H | $-CH_2CH_3$ | $-CH_2CH_2OCOCH_3$ |
| $C_2H_5$ | H | H | $-CH_2CH_3$ | $-CH_2CH_2CN$ |
| H | H | H | $-CH_2CH_2OCOCH_3$ | $-CH_2CH_2OCOCH_3$ |
| H | H | H | $-CH_2CH_2CN$ | $-CH_2CH_2OH$ |
| H | H | H | $-CH_2CH_2CN$ | $-CH_2CH_2OCOCH_3$ |
| H | H | H | $-CH_2CH_2CN$ | $-CH_2CH_2CN$ |
| H | H | H | $-CH_2CH_3$ | $-CH_2CH_2OH$ |
| H | H | H | $-CH_2CH_3$ | $-CH_2CH_2Cl$ |
| H | H | H | $-CH_2CH_2CN$ | $-CH_2CH_2OCOC_6H_5$ |
| $C_2H_5$ | H | H | $-CH_2CH_2CN$ | $-CH_2CH_2CH_2CH_3$ |
| H | H | H | $-C_6H_{11}$ | $-CH_2CHCH_2OH$ <br> \| <br> OH |
| H | H | H | $-C_6H_{11}$ | $-CH_2CH_2OH$ |
| H | $-CH_3$ | H | $-CH_2CH_2OH$ | $-CH_2CH_2OH$ |
| H | $-CH_3$ | H | $-CH_2CH_2OH$ | $-CH_2CH_3$ |
| $CH_2C_6H_{11}$ | $-CH_3$ | H | $-CH_2CH_2OCOCH_3$ | $-CH_2CH_2OCOCH_3$ |
| H | $-CH_3$ | H | $-CH_2CH_3$ | $-CH_2CHCH_2OH$ <br> \| <br> OH |
| $C_2H_4C_6H_5$ | $-CH_3$ | H | $-CH_2CH_3$ | $-CH_2CH_2CN$ |
| H | $-CH_3$ | H | $-CH_2CH_3$ | $-CH_2CH_2Cl$ |
| H | $-CH_3$ | H | $-CH_2CH_2SO_2CH_2CH_2-$ | |
| $CH_3$ | $-NHCOCH_3$ | H | $-CH_2CH_3$ | $-CH_2CH_2CN$ |
| $CH_3$ | $-NHCOCH_3$ | H | $-CH_2CH_2OCOCH_3$ | $-CH_2CH_2OCOCH_3$ |
| H | $-NHCOCH_3$ | $-CH_3$ | $-H$ | $-CH_2CH_2CN$ |
| H | $-NHCOCH_3$ | $-CH_3$ | $-H$ | $-CH(CH_3)CH_2CH_3$ |
| H | H | $-OCH_3$ | $-H$ | $-C_6H_{11}$ |
| H | $-CH_3$ | H | $-CH_2CH_3$ | $-CH_2CH_2SO_2NH_2$ |
| H | $-NHCOCH_3$ | H | H | $-CH_2C_6H_5$ |
| H | $-NHCOCH_3$ | H | H | $-CH_2CH_2OCH_3$ |

TABLE 1-continued

Structure: FSO₂−C(=C(R)−)−S−C(=C(SO₂F)−)−N=N−[phenyl with R¹, R² substituents]−N(R³)(R⁴)

| R | R¹ | R² | R³ | R⁴ |
|---|---|---|---|---|
| H | —NHCOCH₃ | H | H | —CH(CH₃)CH₂CO₂CH₂CH₃ |
| H | —NHCOCH₃ | H | H | —CH(CH₂CH(CH₃)₂)CH₂CH(CH₃)₂ |
| H | —NHCOCH₃ | H | H | —CH₂CH(OH)CH₂OH |
| H | —NHCOCH₃ | H | H | —CH(CH₃)—CH₂CH₃ |
| H | NHCOC₆H₅ | CH₃ | H | —C₆H₁₁ |
| H | NHCONHC₂H₅ | H | CH₂CH₃ | CH₂CH₃ |
| H | NHCO₂C₂H₅ | H | CH₂CH₃ | CH₂C₆H₅ |
| H | NHCOCH₂OH | H | CH₂CH₃ | C₆H₅ |
| H | NHCOCH₂OCH₃ | H | CH₂CH₃ | CH₂CH₂OH |
| H | NHCOCH₂CN | H | CH₂CH₃ | CH₂CH₂OCOCH₃ |
| H | CH₃ | OCH₃ | CH₂CH₃ | CH₂CH₂CN |
| H | CH₃ | OC₂H₅ | CH₂CH₂CN | H |
| H | OCH₃ | OCH₃ | CH₂CH₂CN | CH₂CH₂OH |
| H | CH₃ | CH₃ | CH₂CH₂CN | CH₂CH₂OCOCH₃ |
| H | NHCOCH₃ | Cl | CH₂CH₂CN | CH₂CH₂OCOC₆H₅ |
| H | Cl | OCH₃ | CH₂CH₂OH | CH₂CH₂OH |
| H | H | H | CH₂CH₂OCOCH₃ | CH₂CH₂OCOCH₃ |
| H | H | H | —CH₂CH₂SO₂CH₂CH₂— | |
| H | Cl | Cl | H | CH₂CH₂CN |
| H | CH₃ | H | CH₂CH₃ | CH₂CH(OCOCH₃)—CH₂OCOCH₃ |
| H | CH₃ | H | CH₂CH₃ | CH₂CH₃ |
| H | CH₃ | H | CH₂CH₃ | CH₂CH₂OH |
| H | CH₃ | H | CH₂CH₃ | CH₂CH₂NHCO₂CH₃ |
| H | CH₃ | H | CH₂CH₃ | CH₂CH₂NHCOC₆H₅ |
| H | CH₃ | H | CH₂CH₂CN | CH₂CH₂NHCOC₆H₁₁ |
| H | NHCOCH₃ | H | CH₂CH₃ | CH₂CH₃ |
| H | NHCOCH₃ | H | CH₂CH₃ | CH₂CH₂OCOCH₃ |
| H | NHCOCH₃ | H | CH₂CH₃ | (CH₂CH₂O)₂CH₂CH₃ |
| H | NHCOC₆H₅ | H | CH₂CH₃ | CH₂CH₂CONH₂ |
| H | NHCOC₆H₅ | CH₃ | H | CH₂CH₃ |
| H | NHCOCH₃ | OCH₃ | CH₂CH₃ | CH₂CH₃ |
| H | NHCOCH₃ | OCH₃ | CH₂CH₃ | CH₂CH₂OCOCH₃ |
| H | NHCOCH₃ | OCH₃ | CH₂CH₃ | CH₂CH(OH)CH₃ |
| H | NHCOCH₃ | OCH₃ | CH₂CH₂OH | CH₂CH₂OH |
| H | NHCOCH₃ | OCH₃ | CH₂CH₂OCOCH₃ | CH₂CH₂OCOCH₃ |
| H | NHCOCH₃ | OCH₃ | CH₂CH₃ | —C₆H₁₁ |
| H | NHCOCH₃ | H | CH₂CH₃ | CH₂CH₂OC(=O)NH—C₆H₅ |

TABLE II

Structure: FSO₂−C(=C(R)−)−S−C(=C(SO₂F)−)−N=N−[aryl fused with tetrahydroquinoline bearing R¹, R², R⁵, R⁶, R⁷, R⁸ and N−R³]

| R | R¹, R², R⁵, R⁶, R⁷, R⁸ | R³ |
|---|---|---|
| CH₃ | 2,7-di-CH₃ | —C₂H₄OH |

TABLE II-continued

Structure: FSO₂-C(=C(R)-)S-C(=N-N=Ar)... where Ar is a tetrahydroquinoline with R¹, R², R⁵, R⁶, R⁷, R⁸ substituents and N-R³

| R | R¹, R², R⁵, R⁶, R⁷, R⁸ | R³ |
|---|---|---|
| $C_2H_5$ | 2,5-di-$CH_3$—8-$OCH_3$ | —$CH_2CH(OH)CH_2OH$ |
| H | 2,2,4,7-tetra-$CH_3$ | —$C_2H_4CONH_2$ |
| H | 2,2,4-tri-$CH_3$ | —$C_2H_4NHCOCH_3$ |
| H | 2-$CH_3$—7-$NHCOCH_3$ | —$C_2H_4CN$ |
| H | 2,2,4-tri-$CH_3$—7-$NHCOOH_3$ | —$C_2H_4Cl$ |
| H | 2-$CH(CH_3)_2$—7-$NHCOOH_3$ | —$C_2H_4OCOCH_3$ |
| H | 7-$CH_3$ | —$C_2H_4OC_2H_5$ |
| H | 2,2,4-di-$CH_3$—5,8-di-$OCH_3$ | —$C_2H_4NHCOCH=CH_2$ |
| H | 2,7-di-$CH_3$ | —$C_2H_5$ |
| H | 2,5-di-$CH_3$—8-$OCH_3$ | —$C_2H_4SO_2NH_2$ |
| $CH_2C_6H_{11}$ | 2,2,4,7-tetra-$CH_3$ | —$C_2H_4SO_2NHC_2H_5$ |
| H | 2,2,4-tri-$CH_3$—7-$NHCOC_2H_5$ | $C_2H_5$ |
| $CH_3$ | 7-$CH_3$ | —$C_2H_4O$—C₆H₅ (phenyl) |
| H | 2,2,4-di-$CH_3$—5,8-di-$OCH_3$ | —$C_2H_4OC_6H_5$ |
| H | 2-$CH_3$—7-$NHCOCH_3$ | —$C_2H_4Cl$ |
| H | 2,7-di-$CH_3$ | —$C_2H_4OC_6H_5$ |
| H | 2,5-di-$CH_3$—8-$OCH_3$ | —$C_2H_4OC_6H_5$ |
| H | 2,2,4-tri-$CH_3$ | —$C_2H_4Cl$ |
| H | 2-$CH_3$—7-$NHCOCH_3$ | —$C_2H_4NHC(O)$—C₆H₅ |
| H | 2,2,4-tri-$CH_3$—7-$NHCOCH_3$ | —$C_2H_4NHC(O)$—C₆H₅ |
| H | 7-$CH_3$ | —$CH_2CH_2OC_6H_5$ |
| H | 2,2,4,7-tetra-$CH_3$ | —$CH_2CH_2OC(O)NH$—C₆H₅ |
| H | 2,2,4,7-tetra-$CH_3$ | —$CH_2CH_2Cl$ |

TABLE III

Structure: FSO₂-C(=C(R)-SO₂F)S-C(=N-N=Ar)... where Ar is a morpholine-substituted aniline with R¹, R², R⁵ and N-R³

| R | R¹, R², R⁵ | R³ |
|---|---|---|
| $CH_3$ | 3,6-di-$CH_3$ | —$C_2H_4OH$ |
| $C_2H_5$ | 3-$CH_3$ | —$CH_2CH(OH)CH_2OH$ |
| H | 3-$CH_3$—6-$NHCOCH_3$ | —$C_2H_4CONH_2$ |
| H | 6-$NHCOCH_3$ | —$C_2H_4NHCOCH_3$ |
| H | 3,6-di-$CH_3$ | —$C_2H_4CN$ |
| H | 3-$CH_3$ | —$C_2H_4Cl$ |

TABLE III-continued

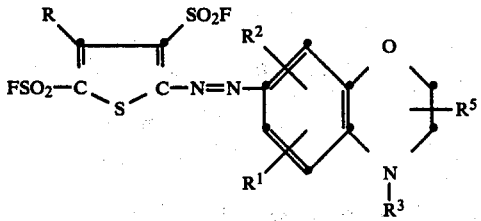

| R | $R^1, R^2, R^5$ | $R^3$ |
|---|---|---|
| H | 3-$CH_3$—6-$NHCOCH_3$ | —$C_2H_4OOCC_2H_5$ |
| H | 6-$NHCOCH_3$ | —$C_2H_4OC_2H_5$ |
| $C_2H_5$ | 3-$CH_3$ | —$C_2H_4CONHC_2H_5$ |
| H | 6-$NHCOCH_3$ | —$C_2H_4OCOC_2H_5$ |
| H | 3,6-di-$CH_3$ | —$C_2H_4NHCOCH=CH_2$ |
| H | 3,6-di-$CH_3$ | —$C_2H_5$ |
| H | 3-$CH_3$ | —$C_2H_4SO_2NH_2$ |
| $CH_2C_6H_{11}$ | 3-$CH_3$—6-$NHCOCH_3$ | —$C_2H_4SO_2NHC_2H_5$ |
| H | 3-$CH_3$—6-$NHCOCH_3$ | —$CH_2CH_2OC_6H_5$ |
| $CH_3$ | 3,6-di-$CH_3$ | —$C_2H_4OC_2H_5$ |
| $CH_3$ | 3-$CH_3$ | —$CH_2\underset{OH}{C}HCH_2OH$ |
| H | 6-$NHCOCH_3$ | —$C_2H_4OC_6H_5$ |
| H | 3,6-di-$CH_3$ | —$C_2H_4Cl$ |
| H | 3-$CH_3$ | —$C_2H_4OC_6H_5$ |
| H | 3-$CH_3$—6-$NHCOCH_3$ | —$C_2H_4OC_6H_5$ |
| H | 6-$NHCOCH_3$ | —$C_2H_4OC_6H_5$ |
| H | 3,6-di-$CH_3$ | —$C_2H_4OC_6H_5$ |
| H | 3-$CH_3$ | —$C_2H_4OC_6H_5$ |
| H | 3,6-di-$CH_3$ | —$C_2H_4NHC(O)C_6H_5$ |
| H | 3-$CH_3$ | —$C_2H_4NHC(O)C_6H_4OCH_3$ |
| H | 6-$NHCOCH_3$ | —$CH_2CH_2OC_2H_4OC_2H_5$ |
| H | 3,6-di-$CH_3$ | —$C_2H_4OH$ |
| H | 3-$CH_3$ | —$CH_2CH_2OC_2H_4OC_2H_5$ |
| H | 3,6-di-$CH_3$ | —$CH_2CH_2OC(O)NHC_6H_5$ |

The invention has been described in detail with particular reference to preferred embodiments thereof, but it will be understood that variations and modifications can be effected within the spirit and scope of the invention.

I claim:

1. A compound having the formula

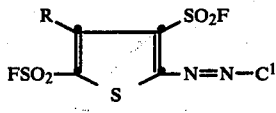

wherein R is hydrogen, alkyl, or alkyl substituted with aryl or cycloalkyl; and $C^1$ is a coupler selected from those of the formulae:

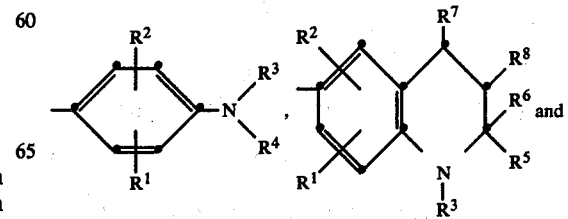

-continued

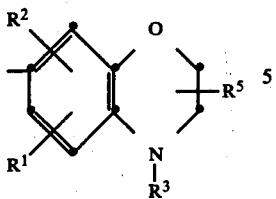

wherein:

$R^1$ and $R^2$ are each selected from hydrogen, fluorine, chlorine, bromine, alkyl, alkoxy, phenoxy, alkylthio, arylthio, and radicals having the formula —NH—X—$R^9$ in which X is —CO—, —COO—, or —$SO_2$— and $R^9$ is selected from alkyl and alkyl substituted with halogen, hydroxy, phenoxy, aryl, cyano, cycloalkyl, alkylsulphonyl, alkylthio, alkanoyloxy, and alkoxy, and when X is —CO—, $R^9$ is also selected from hydrogen, amino, alkenyl, alkylamino, dialkylamino, arylamino, aryl, or furyl;

$R^3$ and $R^4$ are selected from hydrogen; cycloalkyl; cycloalkyl substituted with one or two groups selected from alkyl, —OH, alkoxy, halogen and hydroxy substituted alkyl; phenyl or phenyl substituted with alkyl, alkoxy, halogen, alkanoylamino, cyano or alkoxycarbonyl; straight or branched alkenyl; straight or branched alkyl and such alkyl substituted with one to three of the following: hydroxy; halogen; cyano; alkoxy; alkoxy-alkoxy; alkanoyloxy; phenoxy; phenylcarbamoyloxy; cyclohexyl; phenyl or phenyl substituted with alkyl, alkoxy, halogen, alkanoylamino, cyano or alkoxycarbonyl; alkamoylamino; carbamoyl; sulphamoyl; alkylsulphamoyl; alkylsulphonamido; phenylsulphonamido; alkoxycarbonylamino; alkylcarbamoyloxy; alkoxycarbonyl; alkoxycarbonyloxy; alkenylcarbonylamino; or $R^3$ and $R^4$ combined is pentamethylene, ethyleneoxyethylene or ethylenesulphonylethylene; and $R^5$, $R^6$, $R^7$ and $R^8$ are each selected from hydrogen and alkyl.

2. A compound according to claim 1, wherein R is H; $R_1$ is H, alkyl, or —NH—X—$R^9$; $R_2$ is H or alkyl; $R_3$ is hydrogen or $R_4$; and $R_4$; is selected from cycloalkyl, alkenyl and straight or branched alkyl and such alkyl substituted with one to three of alkoxy, alkoxycarbonyl, alkanoyloxy, alkanoylamino, phenyl, cyclohexyl, cyano, carbamoyl, sulphamoyl, phenoxy or hydroxy.

3. A compound according to claim 1, of the formula:

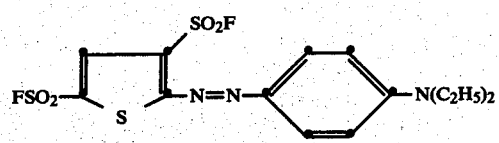

4. A compound according to claim 1, of the formula:

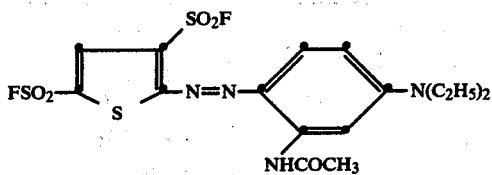

5. A compound according to claim 1, of the formula:

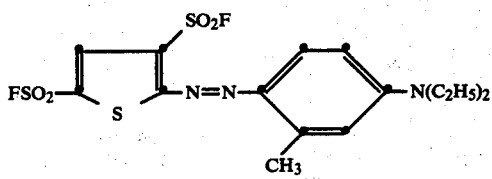

6. A compound according to claim 1, of the formula:

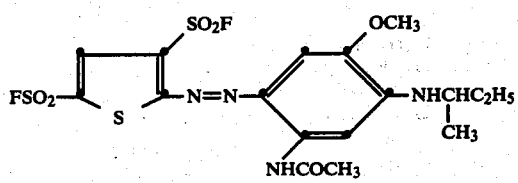

7. A compound according to claim 1, of the formula:

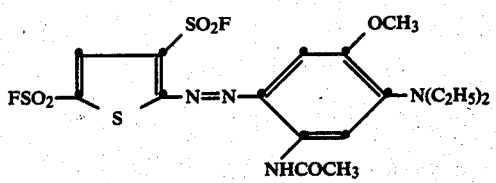

8. A compound according to claim 1, of the formula:

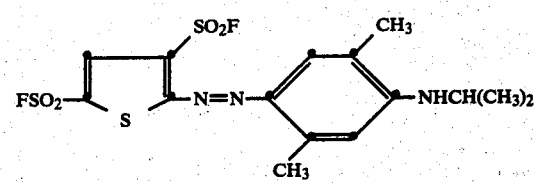

9. A compound according to claim 1, of the formula:

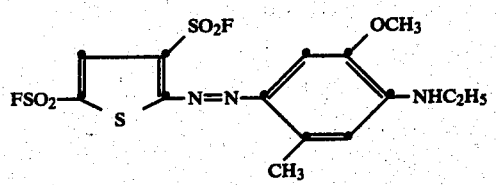

10. A compound according to claim 1, of the formula:

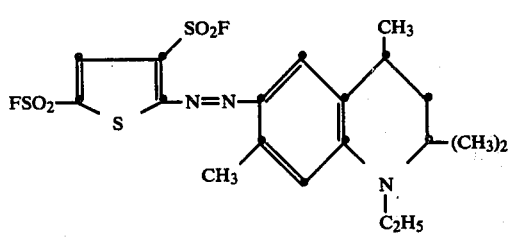
11. A compound according to claim 1, of the formula:
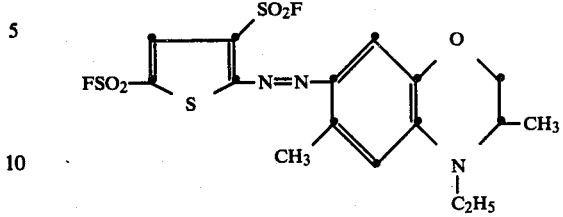
* * * * *